United States Patent [19]

Suzuki et al.

[11] 4,165,419
[45] Aug. 21, 1979

[54] METAL SURFACES COATED WITH ALIPHATIC ACIDS CONTAINING 12 CARBON ATOMS OR MORE TO ELIMINATE POLYMER BUILD-UP ON REACTOR WALLS DURING THE POLYMERIZATION OF WATER-SOLUBLE CATIONIC POLYMERS

[75] Inventors: Naoyuki Suzuki; Yoji Wada; Akihisa Furuno; Iwao Ohshima; Yukio Shibuya, all of Yokohama, Japan

[73] Assignees: Nitto Chemical Industry Co., Ltd.; Mitsubishi Rayon Co., Ltd.; Diafloc Co., Ltd., all of Tokyo, Japan

[21] Appl. No.: 912,804

[22] Filed: Jun. 5, 1978

[30] Foreign Application Priority Data

Jun. 3, 1977 [JP] Japan ................... 52-65383

[51] Int. Cl.$^2$ ................... C08F 2/00; C08F 18/00
[52] U.S. Cl. ................... 526/62; 427/239; 526/74; 526/292
[58] Field of Search ................... 526/62, 74, 216, 923, 526/292; 427/239; 210/58

[56] References Cited

U.S. PATENT DOCUMENTS

| | | | |
|---|---|---|---|
| 3,082,198 | 3/1963 | Klein | 526/74 |
| 3,515,709 | 6/1970 | Nelson et al. | 526/74 |
| 3,661,880 | 5/1972 | Markert et al. | 526/62 |

FOREIGN PATENT DOCUMENTS 308020 9/1971 U.S.S.R. ................... 526/62

Primary Examiner—Herbert J. Lilling
Attorney, Agent, or Firm—Sughrue, Rothwell, Mion, Zinn and Macpeak

[57] ABSTRACT

A method for producing a water-soluble cationic polymer by polymerizing, in the presence of water, a high concentration of (a) at least one vinyl monomer represented by the following general formula (I)

$$CH_2=CR_1COOR_2N^{\oplus}R_3R_4R_5X^{\ominus} \qquad (I)$$

wherein $R_1$ is —H or —CH$_3$; $R_2$ is —CH$_2$CH$_2$— or —CH$_2$CH(OH)CH$_2$—; $R_3$ and $R_4$, which may be the same or different, each is —CH$_3$ or —CH$_2$CH$_3$; $R_5$ is —C$_n$H$_{2n+1}$ where n is 0 or an integer of 1 to 4, —CH$_2$C$_6$H$_5$, or —CH$_2$COOH; and X is Cl$^-$, Br$^-$, $\frac{1}{2}$SO$_4^{--}$ or CH$_3$SO$_4^-$, or (b) a mixture of (i) at least one vinyl monomer represented by the general formula (I) and (ii) at least one other vinyl monomer copolymerizable therewith, wherein the vinyl monomer represented by the general formula (I) is present in the mixture in a predominant amount, and obtaining a polymer in a lump form, the improvement comprising performing the polymerization in a polymerization zone defined by a metal surface or surfaces, in which the metal surface(s) contacted during the polymerization have been coated with a layer of at least one of a higher aliphatic acid having 12 or more carbon atoms, an ammonium salt of a higher aliphatic acid having 12 or more carbon atoms and/or an alkali metal salt of a higher aliphatic acid having 12 or more carbon atoms.

12 Claims, No Drawings

METAL SURFACES COATED WITH ALIPHATIC ACIDS CONTAINING 12 CARBON ATOMS OR MORE TO ELIMINATE POLYMER BUILD-UP ON REACTOR WALLS DURING THE POLYMERIZATION OF WATER-SOLUBLE CATIONIC POLYMERS

BACKGROUND OF THE INVENTION

1. Field of the Invention

This invention relates to a process for producing a cationic polymer and, more particularly, to a process for producing a water-soluble cationic polymer in a lump form.

2. Description of the Prior Art

A polymer derived from a vinyl monomer represented by the general formula (I) described hereinbelow is known as an excellent cationic flocculant and is widely used as a clarifying agent for domestic and industrial waste water or as a dehydration aid for organic sludge, e.g., as disclosed in Japanese Patent Publication No. 9534/58, U.S. Pat. Nos. 3,171,805, 3,414,513 and 3,414,514. Such a polymer is also used as an auxiliary in paper making, a textile treating agent, and a soil conditioner.

A number of methods for producing cationic polymers have heretofore been reported. One method, e.g., as disclosed in U.S. Pat. No. 3,099,636 and German Patent No. 1,153,174, comprises polymerizing a monomer in an aqueous solution in a concentration such that fluidity of the polymerization mixture still remains after completion of the polymerization, that is, at a water content of about 70% by weight or more, drying the polymerizate and grinding the dried polymerizate.

In another method, e.g., as disclosed in U.S. Pat. No. 3,509,113, the monomer is polymerized in an organic solvent using precipitation polymerization and then the organic solvent is removed. In still another method, e.g., as disclosed in Japanese Patent Application (OPI) No. 13,482/73 and U.S. Pat. No. 3,278,506, an aqueous solution of the monomer is suspended in an organic solvent and polymerization is carried out using suspension polymerization and the resulting polymer is separated from the organic solvent by filtration and then dried.

These methods, however, are not entirely satisfactory from an industrial standpoint, because drying equipment is required to remove a large quantity of water, the manufacturing expense is increased, or a large amount of an organic solvent is used which gives rise to the danger of fire and explosions.

In view of the above, extensive studies were conducted to develop a polymerization process for producing a powdered polymer without the necessity for drying the polymerizate or using an organic solvent and, as a result, it was found as disclosed in Japanese Patent Application No. 57434/1975 (corresponding to U.S. patent application No. 687298/76, filed, May 13, 1976) and now abandoned that is was possible to obtain on a commercial scale an easily grindable polymer in a lump form having excellent performance characteristics by polymerizing in bulk a vinyl monomer represented by the general formula (I) in the presence of a small amount of water.

While the polymerization process disclosed in Japanese Patent Application No. 57434/1975 is an improvement over the prior art methods described above, further improvements therein were found to be desirable.

More specifically, the disclosure in Japanese Patent Application No. 57434/1975 is that care should be taken in handling the water-soluble cationic polymer produced, since this polymer generally has a very high adhesiveness or hygroscopicity.

This is also the case with polymers prepared from vinyl monomers represented by the general formula (I). If the polymerization vessel is composed of glass, stainless steel or the like which is generally used as a material for the polymerization vessel used in vinyl polymerization, the vinyl polymer obtained sticks so tenaciously to the polymerization vessel that it becomes extremely difficult to recover the vinyl polymer in the form of a lump or a sheet. Coating the glass or a metal surface with a silicone releasing agent or a mineral oil prior to polymerization may improve the tear characteristic (i.e. the ability to remove the polymer from the polymerization vessel) of the polymerization vessel to some extent, but even this method is not entirely satisfactory. The tear characteristic of the polymerization vessel can also be improved by lining the inner metal surfaces of the vessel with synthetic resins such as polytrifluorochloroethylene and polytetrafluoroethylene, but after repeated use of the polymerization vessel, the lining delaminates from the inner walls of the polymerization vessel so that the resulting polymer deposits on the bare walls and becomes difficult to recover from the polymerization vessel.

The polymerization vessel may be composed of polyethylene, polypropylene, polybutylene terephthalate, polycarbonate, polyethylene terephthalate used either alone or reinforced with glass fibers, but thermal expansion due to the heat of polymerization or shrinkage upon cooling causes a deformation of the polymerization vessel to occur, which then prevents easy separation of the resulting polymer from the polymerization vessel. These materials may be formed into a disposable polymerization vessel or a two-part polymerization vessel that allows removal of the polymer even if deformation occurs in the polymerization vessel, but neither type of polymerization vessel has been found to be entirely satisfactory for the industrial production of vinyl polymers from the standpoint of safety, durability and cost.

A polymerization vessel made of a plastic film and sealed against leakage has many advantages because such a polymerization vessel can be shaped into a bag, a tube or any other form, can be used as a disposable vessel for the relatively low cost of the plastic, and can be easily separated from the polymer. However, first of all, because the plastic film is thin, the plastic film is affected by external conditions such as temperature and atmosphere. Secondly, the kinds of the plastic films that can be used are limited because suitable plastics must have good thermal and mechanical characteristics. Thirdly, in actual production on an industrial scale involving complicated steps such as the step of forming a polymerization vessel and the step of tearing the resulting product off the polymerization vessel, certain precautions must be taken against leakage of the polymerization solution. Fourthly, no matter how low the cost is, use of the polymerization vessel only once with subsequent discard inevitably results not only in increased cost for the polymer product but also contributes to a waste of resources.

As explained above, a plastic polymerization vessel is not necessarily satisfactory for use in industrial production. On the other hand, metals which are heat resistant, have high form stability, and are relatively inexpensive may prove an advantageous material for a polymerization vessel.

SUMMARY OF THE INVENTION

Noting the advantages of a metallic polymerization vessel, intensive studies have now been conducted on a method for improving the tear characteristic of a metal surface from the resulting polymer so as to recover the polymer easily. It has been now found that by treating the surfaces of the inner walls of the polymerization vessel with a solution or a suspension containing at least one of a higher aliphatic acid having 12, preferably 16 to 24, carbon atoms, an alkali metal salt or an ammonium salt of such an aliphatic acid, the resulting polymer can easily be recovered from the polymerization vessel.

Accordingly, this invention provides a method for producing a water-soluble cationic polymer by polymerizing, in the presence of water, a high concentration of (a) at least one vinyl monomer represented by the following formula (I)

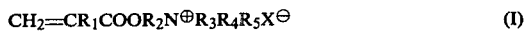     (I)

wherein $R_1$ is —H or —CH$_3$; $R_2$ is —CH$_2$CH$_2$— or —CH$_2$CH(OH)CH$_2$—; $R_3$ and $R_4$, which may be the same or different, each is —CH$_3$ or —CH$_2$CH$_3$; $R_5$ is —C$_n$H$_{2n+1}$ where n is 0 or an integer of 1 to 4, —CH$_2$C$_6$H$_5$, or —CH$_2$COOH; and X is Cl$^-$, Br$^-$, $\frac{1}{2}$SO$_4^{--}$ or CH$_3$SO$_4^-$,
or (b) a mixture of (i) at least one vinyl monomer represented by the general formula (I) and (ii) at least one other vinyl monomer copolymerizable therewith, wherein the vinyl monomer represented by the general formula (I) is present in the mixture, in a predominant amount, and obtaining a polymer in a lump form, wherein the improvement comprises performing the polymerization in a polymerization zone defined by a metal surface or surfaces in which the metal surface(s) contacted during the polymerization have been coated with a layer of at least one of a higher aliphatic acid having 12 or more carbon atoms, an ammonium salt of a higher aliphatic acid having 12 or more carbon atoms and/or an alkali metal salt of a higher aliphatic acid having 12 or more carbon atoms.

DETAILED DESCRIPTION OF THE INVENTION

According to the method of this invention, the polymerization vessel is not damaged during polymerization and the polymerization vessel does not need to be discarded after each polymerization, and therefore, not only can the same polymerization vessel be used repeatedly but also the overall polymerization equipment can be simplified, thus permitting easy operation during polymerization and removal of the polymer product.

In the method of this invention, a steel plate plated with a thin film of silver, gold, platinum or chromium, or a stainless steel plate may be used as the material for the metal polymerization vessel, but steel should not be used per se.

The preferred shape of the polymerization vessel is that of a truncated cone, a semi-sphere, a truncated pyramid or any other shape facilitating removal of the polymer. To remove the polymer product, a polymerization vessel of such a shape may be simply turned upside down or the product may be lifted from a stationary polymerization vessel.

Further, two additional methods can be used to remove the polymer product from the polymerization vessel. One method comprises producing the polymer in the form of a sheet by a process comprising closing two opposite edges of opposing metal plates with a synthetic resin which is elastic, thereby constructing a sealed cell therebetween, charging a polymerization solution containing the vinyl monomer of the general formula (I) into the cell and polymerizing the vinyl monomer in the solution with external heating and cooling.

A second method comprises obtaining the polymer in the form of a sheet by continuously polymerizing the vinyl monomer of the general formula (I) in a polymerization solution using a continuous polymerization apparatus. Such a continuous polymerization apparatus can comprise two opositely disposed and separated thin metal plates, each in the form of a plate or an endless belt which can be moved in tandem. The separation between the metal plates can be achieved by inserting elastic synthetic resin tubes at two opposite edges of the metal plates to form a polymerization zone defined by the space between the opposing plates and the synthetic resin tubes at each edge. A polymerization solution containing the vinyl monomer of the general formula (I) is then passed into one open end of the polymerization zone as an inlet thereof, the vinyl monomer is polymerized in the polymerization zone as the solution is passed between the metal plates and through the polymerization zone, with external heating and cooling thereof, and a polymerization product in the form of a sheet is obtained from the other open end of the polymerization zone as an outlet thereof. Where the metal plates are not movable, a gravity feed of the polymerization solution through the polymerization zone can be used and where the metal plates are in the form of endless belts, the belts can be moved to pass the polymerization solution through the polymerization zone.

The surfaces of the inner walls of these polymerization vessels or zones can be treated by either of the following two methods. The first method comprises dissolving or dispersing one or more higher aliphatic acids having 12 or more carbon atoms (e.g., having 12 to 24 carbon atoms) and/or the alkali metal salts (e.g., the sodium salts, the potassium salts, the lithium salts) and/or the ammonium salts thereof, e.g., in an amount of about 0.01 to 10% by weight, preferably 0.1 to 1% by weight, in a solvent and coating the resulting solution or dispersion onto the metal surface, e.g., at normal temperatures, followed by drying, e.g., at a temperature up to the boiling point of the solvent used. Suitable solvents which can be used are methanol, ethanol, acetone, carbon tetrachloride, benzene or water. Aqueous alcoholic solutions and mixtures of ethanol and methanol and the like can also be used. The second method comprises charging the polymerization vessel with a mixture of water and one or more of the aliphatic acids and/or the alkali metal or ammonium salts thereof, e.g., in a concentration of about 0.01 to about 10% by weight, preferably 0.1 to 1% by weight, and maintaining the mixture at about 70° C. or higher, e.g., up to about 100° C., for at least about 5 minutes, e.g., about 5 minutes to about 60 minutes, so as to coat the molecules of the aliphatic acid on the metal surface. Other solvents than water can be employed, for example, methanol, ethanol, or the like but are less preferred because the higher aliphatic acid or salt thereof is less soluble in methanol or ethanol. The effect of the surface treatment obtained with the first method disappears only after one or two polymerizations, whereas the effect obtained by the second method lasts for a period of 5 or 6 polymerizations, and the higher the temperature for the thermal treatment or the longer the treating time, the longer the desired effect lasts. However, no appreciable enhancement of the effect is observed even if the surface treatment is extended for a period longer than necessary. Experimentally, it has been determined, no significant difference was observed between the results obtained by heating at 100° C. for a period longer than 60 minutes and those obtained by heating at 100° C. for 50 minutes. Alternatively a solution of the higher aliphatic acid or salt thereof as described above can be sprayed onto the metal surfaces or the higher aliphatic acid or salt thereof can be melted onto the metal surfaces.

Suitable preferred aliphatic acids which can be used in this invention are saturated higher aliphatic acids such as lauric acid, myristic acid, palmitic acid, stearic acid, arachic acid, behenic acid and lignoceric acid. Particularly preferred higher aliphatic acids are stearic acid, palmitic acid and myristic acid. In general, higher aliphatic acids are obtained from animal or plant sources, and as a result naturally occurring higher aliphatic acids are not single compounds with a specific number of carbon atoms but rather are a mixture of higher aliphatic acids with the number of carbon atoms being distributed in a certain range. As described above, the most preferred aliphatic acids for use in the method of this invention are saturated aliphatic acids, but commercially available saturated aliphatic acids generally contain a small amount of unsaturated aliphatic acids, e.g., about 3 to 9% by weight. These commercially available materials which contain unsaturated aliphatic acids as impurities as well and where the distribution of the number of carbon atoms of the aliphatic acids therein varies can be used in the method of this invention without difficulty.

The minimum amount required of these aliphatic acids and/or the alkali metal or ammonium salts thereof is such that they deposit uniformly on the effective surface of the inner walls of the polymerization vessel. In general, a monomolecular film or greater of the aliphatic acids and/or the alkali metal or ammonium salts thereof is suitable.

According to this invention, the polymerization is effected as follows: a vinyl monomer that comprises predominantly, e.g., in an amount of about 50% by weight or more, a monomer which is represented by the general formula (I)

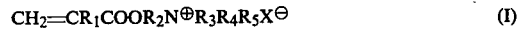
$$CH_2=CR_1COOR_2N^{\oplus}R_3R_4R_5X^{\ominus} \qquad (I)$$

wherein $R_1$ is —H or —CH$_3$; $R_2$ is —CH$_2$CH$_2$— or —CH$_2$CH(OH)CH$_2$—; $R_3$ and $R_4$, which may be the same or different, each is —CH$_3$ or —CH$_2$CH$_3$; $R_5$ is —C$_n$H$_{2n+1}$ where n is 0 or an integer of 1 to 4, —CH$_2$C$_6$H$_5$, or —CH$_2$COOH; and X is Cl$^-$, Br$^-$, $\frac{1}{2}$SO$_4^{--}$ or CH$_3$SO$_4^-$,
is mixed with water such that the water content is about 22% by weight or less, preferably from 7 to 18% by weight. The pH of the mixture is adjusted to about 2 to 9.5, preferably 3 to 8; and after addition of a polymerization initiator, the mixture is charged into a polymerization vessel for polymerization. To assure completion of the polymerization, the polymerization is so controlled that the final polymerization temperature is within the range of about 100° to about 150° C.

Suitable polymerization initiators which can be used include reducing agents such as ferrous salts (e.g., ferrous sulfate, ferrous nitrate, etc.), L-ascorbic acid, rongalite (formaldehyde-sodium sulfoxide) or sulfites (e.g., sodium bisulfite, potassium bisulfite, etc.), peroxides such as hydrogen peroxide, alkali metal persulfates (e.g., potassium persulfate, ammonium persulfate, etc.), t-butyl hydroperoxide, or cumene hydroperoxide, with these reducing agents generally being used in amounts of about 5 to about 1,000 ppm, preferably 10 to 100 ppm of the polymerization system. Water soluble azo compounds (e.g., 2,2'-(2-amidinopropane)hydrochloride, azo-bisisobutyronitrile, etc.) may be suitably employed, e.g., in an amount of about 1 to about 500 ppm, preferably 2 to 100 ppm, of the polymerization system as polymerization initiators.

In addition to the monomer represented by the general formula (I) above, acrylonitrile, methacrylonitrile, acrylamide, methacrylamide, acrylic acid, methacrylic acid, the salts of acrylic acid or methacrylic acid, methyl acrylate, methyl methacrylate, vinyl pyridine, 2-methyl pyridine, etc. may be used in an amount of less than about 50% by weight as copolymerizable monomers. However, care must be taken when these copolymerizable vinyl monomers are used because more than twice as much heat per unit weight as the monomer represented by the general formula (I) is generated when they are used, thus making the control of polymerization difficult to achieve if these copolymerizable vinyl monomers are used in large quantities.

The molecular weight of the resulting polymer can be controlled by combining suitable polymerization initiators or by changing the amounts of the polymerization initiators, but the molecular weight can also be controlled by addition of mercaptans such as β-mercaptoethanol, β-mercaptopropionic acid and thioglycolic acid. The addition of these mercaptans, e.g., in an amount of about 10 to about 10,000 ppm to the polymerization system, results in a significantly accelerated polymerization, and so, these mercaptans may replace a reducing agent used as a polymerization initiator.

Purging the polymerization system of oxygen by means, for example, of nitrogen substitution or de-aeration prior to polymerization is preferred because better reproducibility in the polymerization procedure is obtained.

In the polymerization, a suitable polymerization temperature ranges for a batch type system from an initial temperature of about 5° to about 30° C. with a final temperature of about 100° to about 150° C. and for a system where a polymer sheet is continuously produced from an initial temperature of about 40° to about 70° C. to a final temperature of about 100° to about 150° C.

The thus-obtained polymer is usually maintained at the final temperature of about 100° to about 150° C. for about 3 minutes to about 120 minutes so as to complete the polymerization. The polymer at this final stage is a flexible, semi-solid product which is bonded to the polymerization vessel so tenaciously that the product can not easily be torn off. But the polymer can easily be removed from the polymerization vessel by externally cooling the polymer because the polymer comes off the walls of itself due to the difference in coefficient of thermal expansion between the polymer and the metal of the polymerization vessel, and due to a decrease in the adhesion upon cooling. The polymer turns glassy as cooling progresses further. The temperature at which such glassy state is obtained varies with the structure of the polymer, the water content of the polymer or the amount of residual monomer present in the polymer, but under the conditions to be employed in the method of this invention, the polymer can be satisfactorily ground at normal temperature (about 10° to about 40° C.), and the powdered polymer obtained by coarse grinding and fine grinding that follows can be immediately packed into bags and delivered as a product.

Therefore, according to the method of this invention, a polymer in the form of a lump or a sheet can be produced quite easily from a monomer that predominantly comprises a monomer represented by the general formula (I), and a cationic polymer in powder form can be obtained from this polymer in high yield. The cationic polymer obtained is readily soluble in water and exhibits excellent characteristics as a dehydrating agent for organic sludge or as a clarifying agent for industrial or domestic waste water or sewage.

This invention is now described in greater detail by reference to the following example, which is given for illustrative purpose only and is not to be construed as limiting the present invention. Unless otherwise stated, all percents are by weight.

EXAMPLE

Five buckets, each made of SUS-32 stainless steel, with a height of 27 cm, a radius of 13.5 cm at top, a radius of 10.5 cm at the bottom, a wall thickness of 1 mm, and shaped like a truncated cone standing on its smaller end were subjected to the following Surface Treatments (I) to (V), respectively.

Surface Treatment (I)

The first bucket was filled with deionized water containing 40 ppm of sodium stearate and having a temperature of 95° C., maintained at 90° C. for 60 minutes, drained, and allowed to naturally dry.

Surface Treatment (II)

All of the internal surfaces of the second bucket were coated at normal temperature (about 10° to about 40° C.) with an ethanolic solution weighing 10 g and containing 1000 ppm of sodium palmitate, allowed to stand for 30 minutes, followed by natural drying of the bucket.

Surface Treatment (III)

The third bucket was spray coated at normal temperature with 10 g of an acetone solution containing 1000 ppm of sodium behenate, and allowed to dry naturally.

Surface Treatment (IV)

The fourth bucket was not surface treated and was used as a control.

Surface Treatment (V)

The fifth bucket was filled with deionized water containing 40 ppm of sodium caprate and having a temperature of 90° C., and subjected to Surface Treatment (I) above for use as another control.

Each of the buckets thus prepared was charged with 10 kg of a polymerization solution comprising 0.01% of L-ascobic acid, 0.01% of 2,2'-(2-amidinopropane)hydrochloride, 0.001% of hydrogen peroxide, 16% of deionized water, 83.979% of a methyl chloride quarternary salt of dimethyl aminomethyl methacrylate. The buckets were then placed in a polymerizer wherein the external polymerization temperature corresponded to the internal temperature, and adibatic polymerization was performed while controlling the external polymerization temperature so that it was equal to the internal temperature (at the center of the polymerizer).

Regardless of the difference in surface treatment of the buckets, the graph showing the relationship between polymerization time and temperature was almost the same. The initial polymerization temperature was 24° C., the polymerization started 30 minutes after addition of the initiator, and 75 minutes elapsed before a maximum polymerization temperature of about 124° C. was reached. The maximum temperature of 124° C. was maintained for 60 minutes. The polymer maintained at 124° C. was in the form of a flexible rubbery product, which could not be removed from any of the buckets. Each of the buckets was therefore cooled using the following three methods,

Cooling Method (a)

The bucket was immersed up to its top in cold water at 15° C. for 2 minutes while care was taken to prevent water from entering the bucket.

Cooling Method (b)

Cold air having a temperature of 0° C. was blown against the sides and bottom of the bucket at a flow rate or 500 cm³/sec per cm² of the surfaces of the bucket.

Cooling Method (c)

The bucket was left standing overnight at a temperature of 20° C.

| Bucket | Cooling Method | | |
|---|---|---|---|
| | (a) | (b) | (c) |
| I | o | o | o |
| II | o | Δ | o |
| III | o | Δ | o |
| IV (control) | x | x | x |
| V (control) | x | x | x |

The symbols shown in the table above have the following meaning:
o : The polymer could easily be removed from the bucket.
Δ : The polymer could only be removed from the bucket using an external force, such as pulling.
x : The polymer was bonded to the bucket so strongly that removal of the polymer was extremely difficult.

As the results in the table above show, the polymer could easily be removed from the buckets that were subjected to Surface Treatments (I) to (III) according to the method of this invention, but it was extremely difficult to remove the polymer from the control buckets (untreated or treated with an alkali metal salt of a lower aliphatic acid) to which the polymer was bonded. The polymer removed from the buckets subjected to the surface treatment of this invention was cooled to room temperature, coarsely ground with a jaw crusher to obtain particles having a maximum size of about 5 cm, which were then hammer milled to obtain a powdered product having an average particle size of about 1 mm.

The thus-obtained polymer product was so highly soluble in water that only 2 hours or less was required to dissolve the polymer product to an extent of 1% in an aqueous solution. The 1% aqueous solution of the polymer product had a Brookfield viscosity at about 25° C. of about 4000 cp and contained about 0.7% of residual monomer as determined by ultraviolet absorption spectrophotometry regardless of whether the polymer product had been prepared in bucket (I), (II) or (III).

While the invention has been described in detail and with reference to specific embodiments thereof, it will be apparent to one skilled in the art that various changes and modifications can be made therein without departing from the spirit and scope thereof.

What is claimed is:

1. In a method for producing a water-soluble cationic polymer by polymerizing, in the presence of water, a high concentration of (a) at least one vinyl monomer represented by the following general formula (I)

$$CH_2=CR_1COOR_2N^{\oplus}R_3R_4R_5X^{\ominus} \qquad (I)$$

wherein $R_1$ is —H or —CH$_3$; $R_2$ is —CH$_2$CH$_2$— or —CH$_2$CH(OH)CH$_2$—; $R_3$ and $R_4$, which may be the same or different, each is —CH$_3$ or —CH$_2$CH$_3$; $R_5$ is —$C_nH_{2n+1}$ where n is 0 or an integer of 1 to 4, —CH$_2$C$_6$H$_5$, or —CH$_2$COOH; and X is Cl$^-$, Br$^-$, $\frac{1}{2}$SO$_4^{--}$ or CH$_3$SO$_4^-$,
or (b) a mixture of (i) at least one vinyl monomer represented by the general formula (I) and (ii) at least one other vinyl monomer copolymerizable therewith, wherein said vinyl monomer represented by the general formula (I) is present in said mixture in a predominant amount, and obtaining a polymer in a lump form, the improvement comprising performing the polymerization in a polymerization zone defined by a metal surface or surfaces, in which the metal surface(s) contacted during the polymerization have been coated with a layer of at least one of a higher aliphatic acid having 12 or more carbon atoms, an ammonium salt of a higher aliphatic acid having 12 or more carbon atoms and/or an alkali metal salt of a higher aliphatic acid having 12 or more carbon atoms.

2. The method according to claim 1, wherein said higher aliphatic acid is selected from the group consisting of lauric acid, myristic acid, palmitic acid, stearic acid, arachic acid, behenic acid and lignoceric acid.

3. The method according to claim 2, wherein said higher aliphatic acid is selected from the group consisting of stearic acid, palmitic acid and myristic acid.

4. The method according to claim 1, wherein polymerizing of the vinyl monomer in the presence of water is with the amount of water being about 22% by weight or less of the polymerization mixture.

5. The method according to claim 4, wherein the amount of water is 7 to 18% by weight.

6. The method according to claim 1, wherein the metal surface(s) of the polymerization zone have been subjected to a surface treatment comprising coating the metal surfaces of the polymerization zone with a solution or suspension containing said at least one of a higher aliphatic acid having 12 or more carbon atoms, an ammonium salt and/or an alkali metal salt thereof followed by drying said metal surface(s).

7. The method according to claim 1, wherein the metal surface(s) of the polymerization zone have been subjected to a surface treatment comprising contacting said metal surface(s) with a solution or suspension containing said at least one of a higher aliphatic acid, an ammonium salt and/or an alkali metal salt thereof at a temperature of about 70° C. or higher for at least about 5 minutes followed by drying said metal surface(s).

8. The method according to claim 1, wherein said copolymerizable monomer is at least one monomer selected from the group consisting of acrylonitrile, methacrylonitrile, acrylamide, methacrylamide, acrylic acid, methacrylic acid, a salt of acrylic acid, a salt of methacrylic acid, methylacrylate, methyl methacrylate, vinyl pyridine and 2-methyl pyridine.

9. The method according to claim 1, wherein said metal surface(s) have been coated with said higher aliphatic acid having 12 or more carbon atoms, an ammonium salt and/or an alkali metal salt thereof by spraying thereon a solution or dispersion of said higher aliphatic acid having 12 or more carbon atoms, an ammonium salt and/or an alkali metal salt thereof followed by drying said metal surface(s).

10. The method according to claim 1, wherein said metal surface(s) have been coated with said higher aliphatic acid having 12 or more carbon atoms, an ammonium salt and/or an alkali metal salt thereof by melting said higher aliphatic acid having 12 or more carbon atoms, an ammonium salt and/or an alkali metal salt thereof on said surface(s).

11. The method according to claim 1, wherein said metal of said metal surface(s) is stainless steel or steel having a thin coating of silver, gold, platinum or chromium thereon.

12. The method according to claim 1, wherein said vinyl monomer represented by the general formula (I) is present in an amount of about 50% by weight or more and said monomer copolymerizable therewith is present in an amount of less than about 50% by weight.

* * * * *